Dec. 25, 1962

L. CHAPMAN 3,070,068

GROUND ANCHOR FOR TETHERING ELEMENT

Filed May 8, 1961

INVENTOR.
LONNEL CHAPMAN
BY
BUCKHORN, CHEATHAM & BLORE
ATTORNEYS

United States Patent Office 3,070,068
Patented Dec. 25, 1962

3,070,068
GROUND ANCHOR FOR TETHERING ELEMENT
Lonnel Chapman, Portland, Oreg., assignor, by mesne assignments, to J. J. Windham, Warren, Oreg.
Filed May 8, 1961, Ser. No. 108,602
3 Claims. (Cl. 119—121)

This invention relates to tethering devices for animals, children and other animate and inanimate objects, and the invention particularly relates to a ground anchor to which a tethering element can be connected.

In designing ground anchors, the designer is faced with two requirements, one, to provide an anchor that will resist pull and jerks of a strong animal, and second, to provide an anchor that can be readily driven into the ground or removed from the ground. At present, the commercial anchors known to me are designed in the form of long stakes, either straight or of helical form designed to be driven by a hammer or maul deeply into the ground to make certain that it will not pull loose. Such anchors are difficult to remove from the ground, and usually in removing such stakes they are knocked from side to side until loosened sufficiently to enable them to be pulled out. This frequently leaves a wide hole in the lawn which is objectionable, and furthermore, such removal operation can result in back strain unless the person removing the stake handles himself properly. Still further, such stakes are dangerous in that children or even adults can be injured if they were to fall on a part of the stake projecting above the ground.

While there are noncommercial ground anchors with shorter ground penetration than the commercial anchors just alluded to, the noncommercial anchors suffer in that they are readily dislodged, releasing the animal or other animate or inanimate object being tethered.

It is a main object of the present invention to provide a ground anchor for a tethering element which is so constructed that it can be readily inserted into the ground by pressure applied by the foot of the user, can be readily removed by simple upward pull without strain on the person, yet which will resist the pull of the strongest animal desired to be tethered.

A further object of the invention is to provide such an anchor having a tethering element connecting means of novel construction that functions like a swivel to allow continuous movement of the tethering element about the anchor without fouling of the tethering element on the anchor, and yet has no moving parts.

Another object of the invention is to provide a ground anchor of the type under consideration that has ground-engaging prongs fixedly and permanently secured in a novel way to a plate structure which rests on the ground.

Another important object is to provide a ground anchor of the type under discussion which is relatively small, and while attractive, is inconspicuous and hence does not detract from the decor of the surroundings in which it is placed, and is so constructed that it is safe and will not cause injury in the event a child or adult comes into contact with the anchor.

Various other objects of the invention will be apparent from the following description taken in connection with the accompanying drawings wherein.

Figure 1:
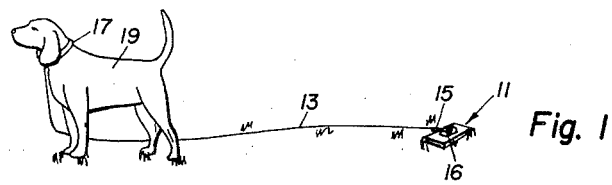
FIG. 1 is a general view showing a ground anchor of the present invention inserted into the ground and an animal tethered to the anchor.

FIG. 1 shows a ground anchor 11 of the present invention inserted in the ground and having a tethering element 13 connected by a simple snap connector 15 to a tethering element connecting means 16 of ground anchor. The opposite end of the tethering element is connected to the collar 17 of an animal 19 being tethered.

Referring to FIGS. 2 to 5, the ground anchor 11 comprises a generally flat elongate plate or platelike structure 21 shown as being of rectangular form and designed to rest on the ground. Depending from the plate are a plurality of prongs 23, six being shown, there being three prongs arranged at each long side of the plate. This locates two prongs at each end of the plate. The prongs are distributed around the periphery of the plate but in spaced relation with respect to the peripheral edge of the plate for reasons to be presently set forth.

Figure 4:
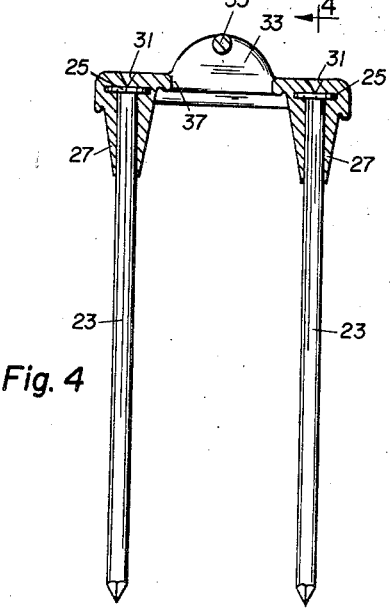
FIG. 4 is a vertical section taken along line 4—4 of FIG. 2.
Figure 5:
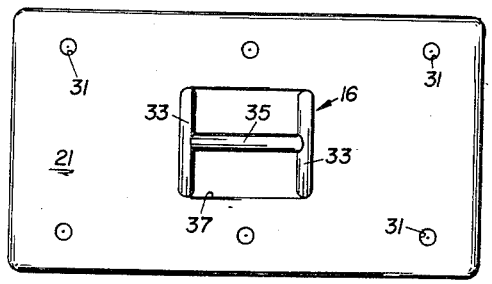
FIG. 5 is a top view of the anchor.

Referring to FIG. 4, each prong has a head 25 at its upper end. The upper portion of each prong, including its head, is cast in the body of the plate 21, the body having a depending sleeve portion 27 for each prong laterally supporting the upper portion of each prong. The head 25 positively prevents separation of a prong and the plate in a direction longitudinally of the prong, and the sleevelike portion 27 resists lateral forces applied to the prong.

I have discovered that I can utilize nails for the prongs 23 so that the prongs do not have to be specially formed, but can be purchased at a minimum cost.

In casting the plate 21 about the upper portions of the prongs 23, the heads 25 may be supported in the mold by small supports that leave the dimples 31 best shown in FIG. 4. The parting line of the mold can conveniently be made at the plane of the top surfaces of the heads of the prongs 23. The bottom ends of the prongs 23 are pointed for ready insertion into the ground.

The plate 21 is cast with a pair of upstanding standards 33 of semicircular form which support a rodlike member 35 which is cast as an integral connection member between the upper portions of the standard. Between the standards 33 and below the rod 35, the plate is formed with a hole 37 which makes it easier for a connector, such as 15, to be connected to the rod 35.

The standards 33 and the rod 35 constitute a tethering element connecting means of fixed construction without moving parts. Yet it functions like a swivel to allow continuous movement of the tethering element about the anchor (such as caused by a circling tethered animal) without foul up because as the tethering element moves over a standard, the connector for the element is deflected upwardly by the curved surfaces of the standard. Thus, the tethering element cannot wind itself about the tethering element connecting means. Therefore, the tethering element connecting means has anti-foul-up characteristics, similar to a swivel despite the fact that it has no moving parts as does a swivel. Because the tethering element connecting means has no moving parts, there is no danger of the tethering element connecting means becoming inoperative because of rust, dirt, or the like.

Figure 3:
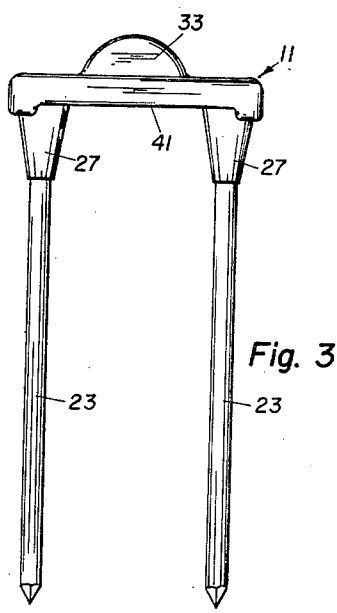
FIG. 3 is an end view of the ground anchor.

The plate 21 is cast with recessed portions 41, best shown in FIG. 3 to provide finger holds enabling the user to insert his fingers beneath the edges of the plate 21 at the ends thereof and remove the plate by simple upward pull. It is here pointed out that while the prongs 23 have substantial penetration into the ground, they do not penetrate the ground nearly as much as the stake type ground anchors now on the market which are driven into the ground from ten to fourteen inches or more. As is well known, the difficulty of soil penetration increases markedly with the depth of penetration and this in part explains why applicant's ground anchor can be readily removed even though it has six prongs, while a single prong inserted deeply in the ground resists removal to a substantially greater degree.

In use, the ground anchor may be readily placed in its operative position by placing the anchor on the ground with the prongs lowermost and applying a downward pressure on the plate, such as by stepping on the plate to press the prongs into the soil. When thus inserted, any force applied to the ground anchor is by virtue of the tethering element 13 and is applied in a generally horizontal direction.

While it may be a somewhat simple matter to tilt the plate if the plate had only one prong 23, with the prongs distributed as shown, all the prongs have to be tilted. Furthermore, whatever direction the plate is tilted, there will be some prongs substantially spaced from the tilt axis and these prongs will have a substantial arc of travel throughout their entire lengths making it impossible to dislodge the ground anchor. In fact, the tethering element 13 or the connector 15 will break before the anchor can be dislodged. In a test, several strong men pulled on a ground anchor of the present invention and could not dislodge the anchor even by pulling and jerking the tethering element. Finally, the tethering element was broken. Yet, the ground anchor was relatively small. For example, the ground anchor just described had a length of five and one-half inches, a width of three inches and a height of six inches.

Because of its small size and because only the plate and tethering element connecting means are above the ground, the ground anchor is unobtrusive and inconspicuous and is hardly noticed on a lawn. Because there is no upwardly projecting post, but only the smooth standards and the rod 35, there is no danger to children or adults who may come into contact with the ground anchor. Thus, if a person accidentally steps on the anchor, or drives over the anchor in a wheeled vehicle, neither the person's foot nor the tires of the vehicle will be harmed. The anchor can be used for a variety of purposes, such as tethering animals or children, or inanimate objects, such as toy planes in flight, or boats while docked, or full size airplanes on the ground.

Figure 2:
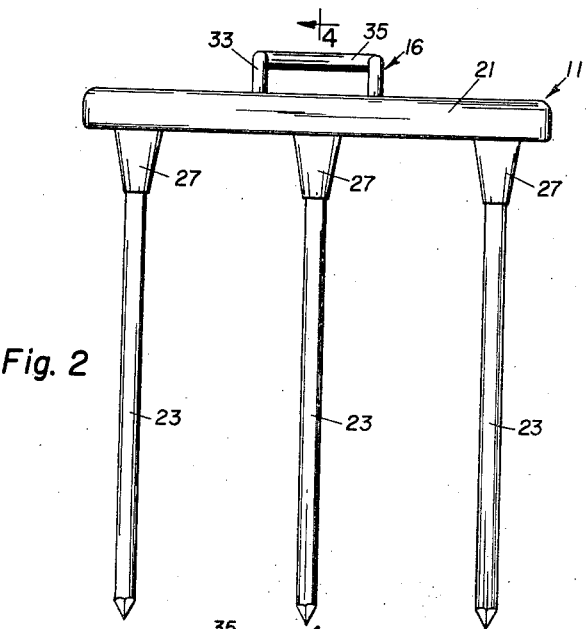
FIG. 2 is a side view in elevation of the ground anchor.

As is apparent from FIGS. 2 through 4, the prongs 23 have substantial length in relation to the size of the plate. In fact, it has been discovered that the ground-holding characteristics of the anchor are substantially impaired if the prongs have a length less than the width of the plate.

It is further pointed out that the prongs are rather uniformly distributed about the center of the plate and in fact, the prongs are separated from one another by an arc less than 90 degrees. It has been found that unless the prongs are spaced arcuately by a distance not greater than 120 degrees, the ground-holding characteristics of the anchor are substantially impaired.

Having described the invention in what is considered to be the preferred embodiment thereof, it is desired that it be understood that the invention is not to be limited other than by the provisions of the following claims.

I claim:
1. A ground anchor comprising
a substantially quadrilateral plate like structure having edge portions,
a plurality of parallel outwardly extending spike-like ground engaging means,
said spike means spaced apart adjacent said edge portions and fixed thereto,
said spike means having a length substantially equal to the longest of said edge portions,
a tethering means on said plate like structure,
said tethering means comprising a pair of standards and a rodlike member to which a tethering element may be connected, said rodlike member extending between the standards in spaced relation above said plate like structure,
said standards being of semicircular form so as to present curved edges to a tethering element to deflect a connector for the element upwardly and over the tethering means so that the element will not wind about the tethering means, whereby the tethering means functions like a swivel although it has no moving parts.

2. A ground anchor comprising:
a substantially quadrilateral plate like structure having edge portions,
a plurality of parallel outwardly extending spike-like ground engaging means,
said spike means spaced apart adjacent said edge portions and fixed thereto,
said spike means having a length not less than the minimum dimension of said plate measured in the plane of said plate,
a tethering means on said plate like structure,
said tethering means comprising a pair of standards and a rodlike member to which a tethering element may be connected, said rodlike member extending between the standards in spaced relation above said plate like structure,
said standards having convexly curved upper edges to deflect the tethering element upwardly and over the tethering means so that the element will not wind about the tethering means, whereby the tethering means functions like a swivel although it has no moving parts.

3. A ground anchor comprising:
a plate like structure having edge portions,
a plurality of parallel outwardly extending spike-like ground engaging means,
said spike means spaced apart adjacent said edge portions and fixed thereto,
said spike means having a length not less than the minimum dimension of said plate measured in the plane of said plate,
a tethering means on said plate like structure,
said tethering means comprising a pair of standards and a rodlike member to which a tethering element may be connected, said rodlike member extending between the standards in spaced relation above said plate like structure,
said standards having convexly curved upper edges to deflect the tethering element upwardly and over the tethering means so that the element will not wind about the tethering means, whereby the tethering means functions like a swivel although it has no moving parts,
said plate like structure being thin relative to its width and length and being sufficiently thin relative to the thickness of said tethering element as to prevent said tethering element from winding thereabout.

References Cited in the file of this patent
UNITED STATES PATENTS

| 657,263 | Bunje | Sept. 4, 1900 |
| 2,812,743 | Dustin | Nov. 12, 1957 |

FOREIGN PATENTS

| 247,742 | Germany | June 5, 1912 |
| 185,333 | Great Britain | Sept. 7, 1922 |